W. MacV. BARKER.
MACHINE FOR MAKING POWDER PELLETS FOR TIMING FUSES.
APPLICATION FILED MAR. 23, 1916.

1,206,498.

Patented Nov. 28, 1916.
6 SHEETS—SHEET 1.

WITNESSES

INVENTOR
Wayne MacVeagh Barker
BY
ATTORNEYS

W. MacV. BARKER.
MACHINE FOR MAKING POWDER PELLETS FOR TIMING FUSES.
APPLICATION FILED MAR. 23, 1916.

1,206,498.

Patented Nov. 28, 1916.
6 SHEETS—SHEET 4.

ON 4-4 FIG. 3.

ON 5-5 FIG. 3.

WITNESSES

INVENTOR
Wayne MacVeagh Barker

BY

ATTORNEYS

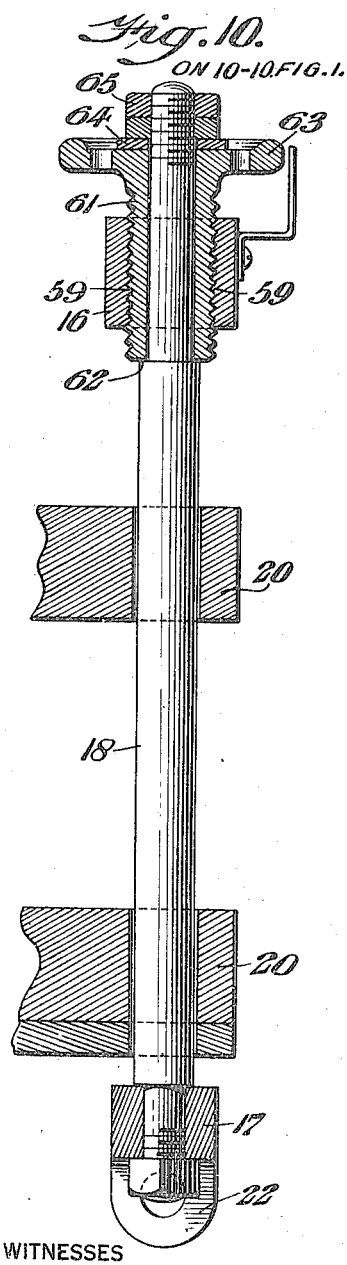
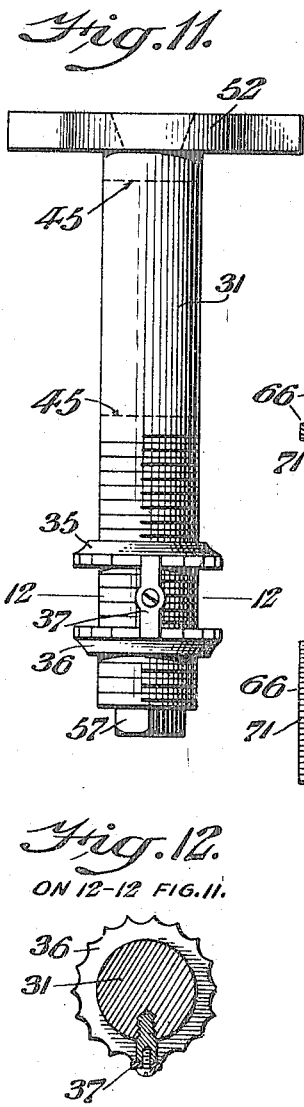
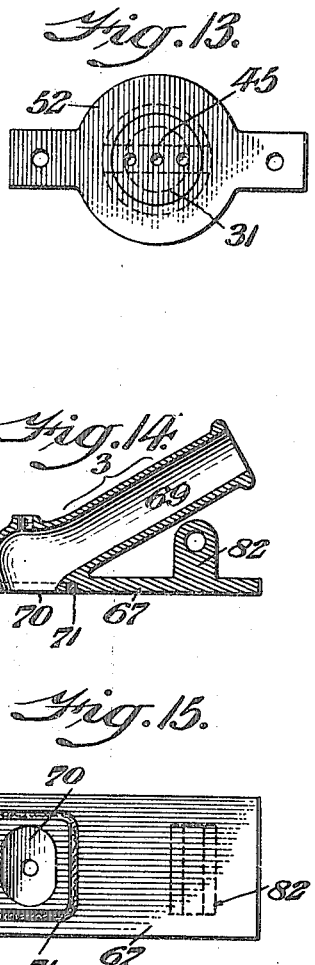
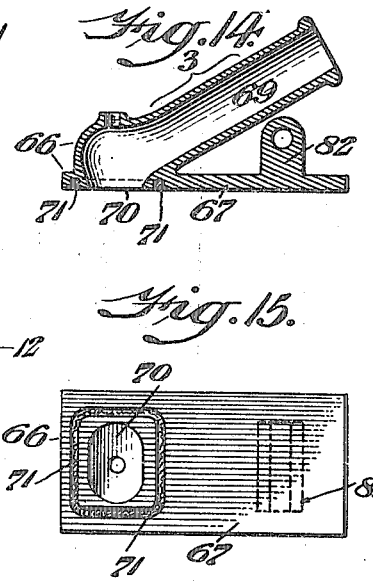
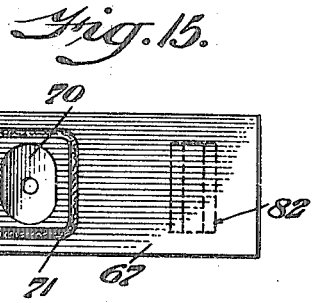
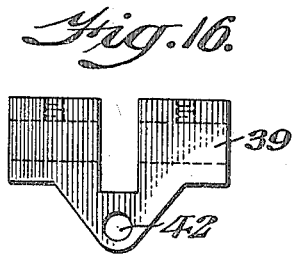

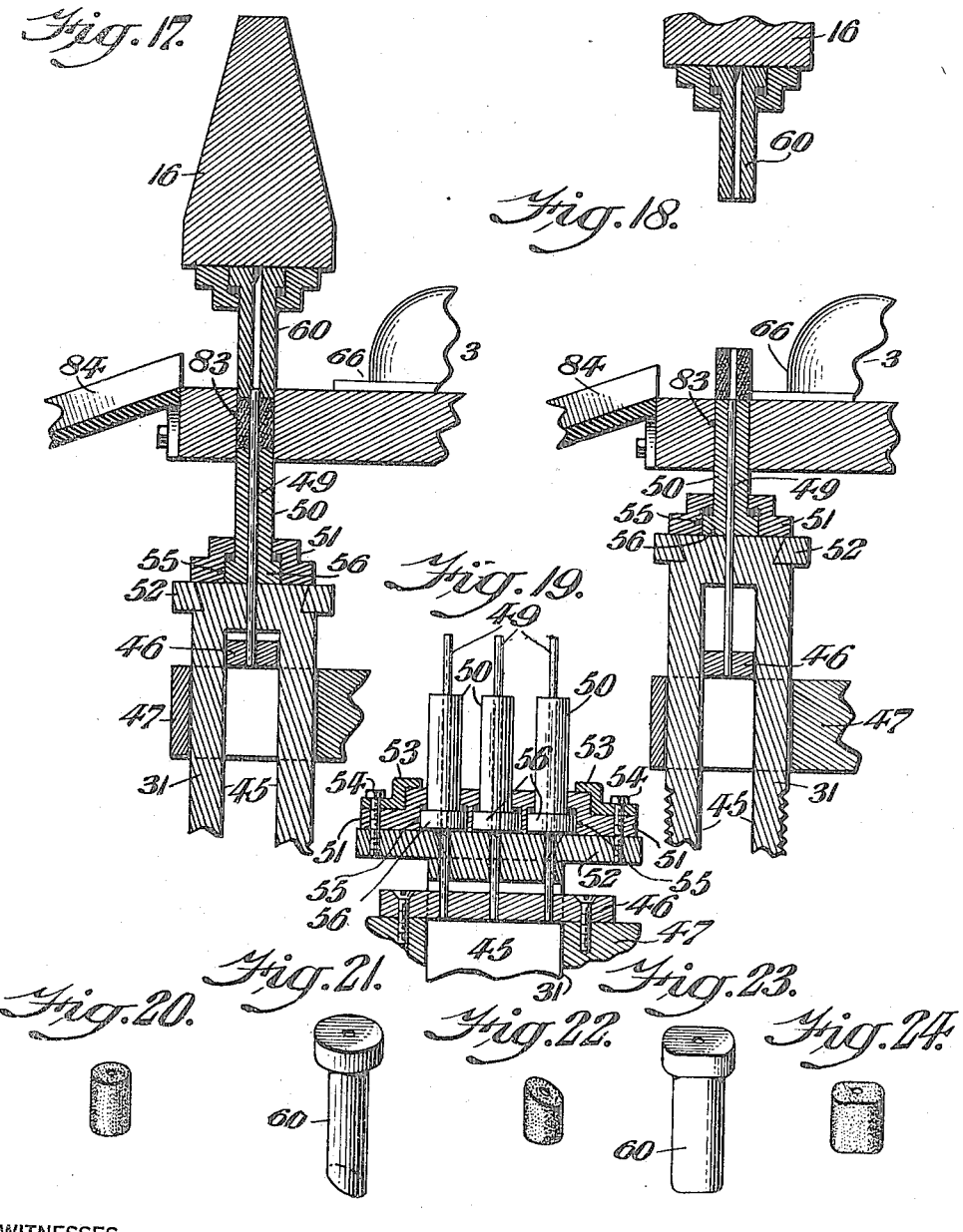

UNITED STATES PATENT OFFICE.

WAYNE MacVEAGH BARKER, OF PHILADELPHIA, PENNSYLVANIA.

MACHINE FOR MAKING POWDER PELLETS FOR TIMING-FUSES.

1,206,498.  Specification of Letters Patent.  Patented Nov. 28, 1916.

Application filed March 23, 1916. Serial No. 86,325.

*To all whom it may concern:*

Be it known that I, WAYNE MacVEAGH BARKER, a citizen of the United States, residing in the city and county of Philadelphia, State of Pennsylvania, have invented a new and useful Machine for Making Powder Pellets for Timing-Fuses, of which the following is a specification.

My invention relates to the art of making timing fuses for shrapnel and other shells, and its object is the construction of a machine of simple and effective character and dependable operation, which is adapted to form pellets of varying formations, for instance, circular or elliptical, or of other cross-section, and either squared off in planes right-angular to their axes or obliquely cut off at their ends. All of these pellets have a central, hollow bore, and in the machines heretofore in use, it has been difficult with certainty to effect the necessary compactness, so that whatever may be the substance or form of the pellet, it will cohere and retain its form.

Although I do not, of course, confine myself to it, I prefer to adapt my machine simultaneously to make a plurality of the pellets;—its general organization, however, can be readily made available to make one pellet at a time. For the purpose, therefore, of illustrating my invention, I have shown in the accompanying drawings a certain type and embodiment of it which is at present preferred by me, because in practice it has given satisfactory and reliable results. It is to be understood, however, that the various instrumentalities in which my invention is embodied can be variously arranged and organized and that my invention is not therefore limited to the precise arrangement and organization of the instrumentalities which are typified in the construction shown in the accompanying drawings and hereinafter described.

Figure 1:
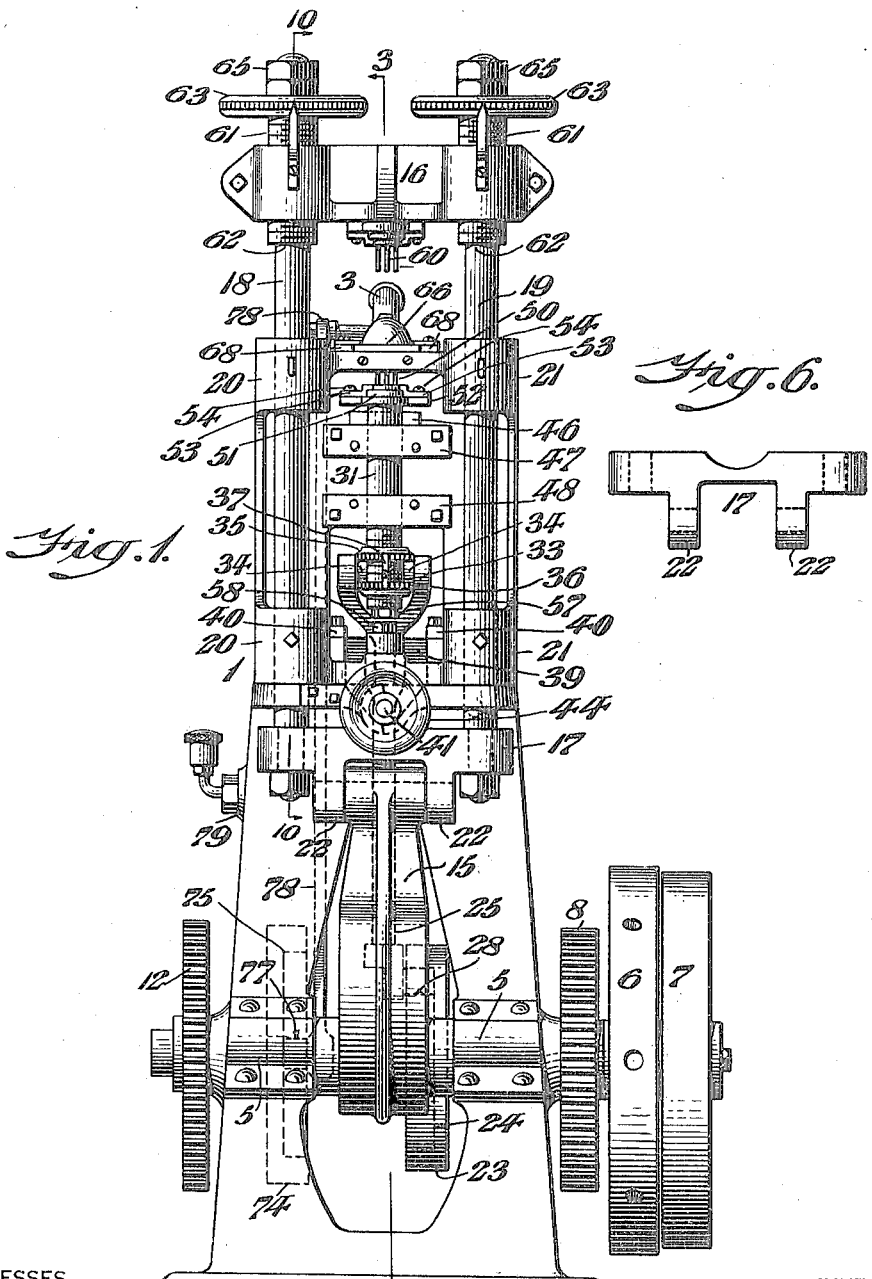
Figure 2:
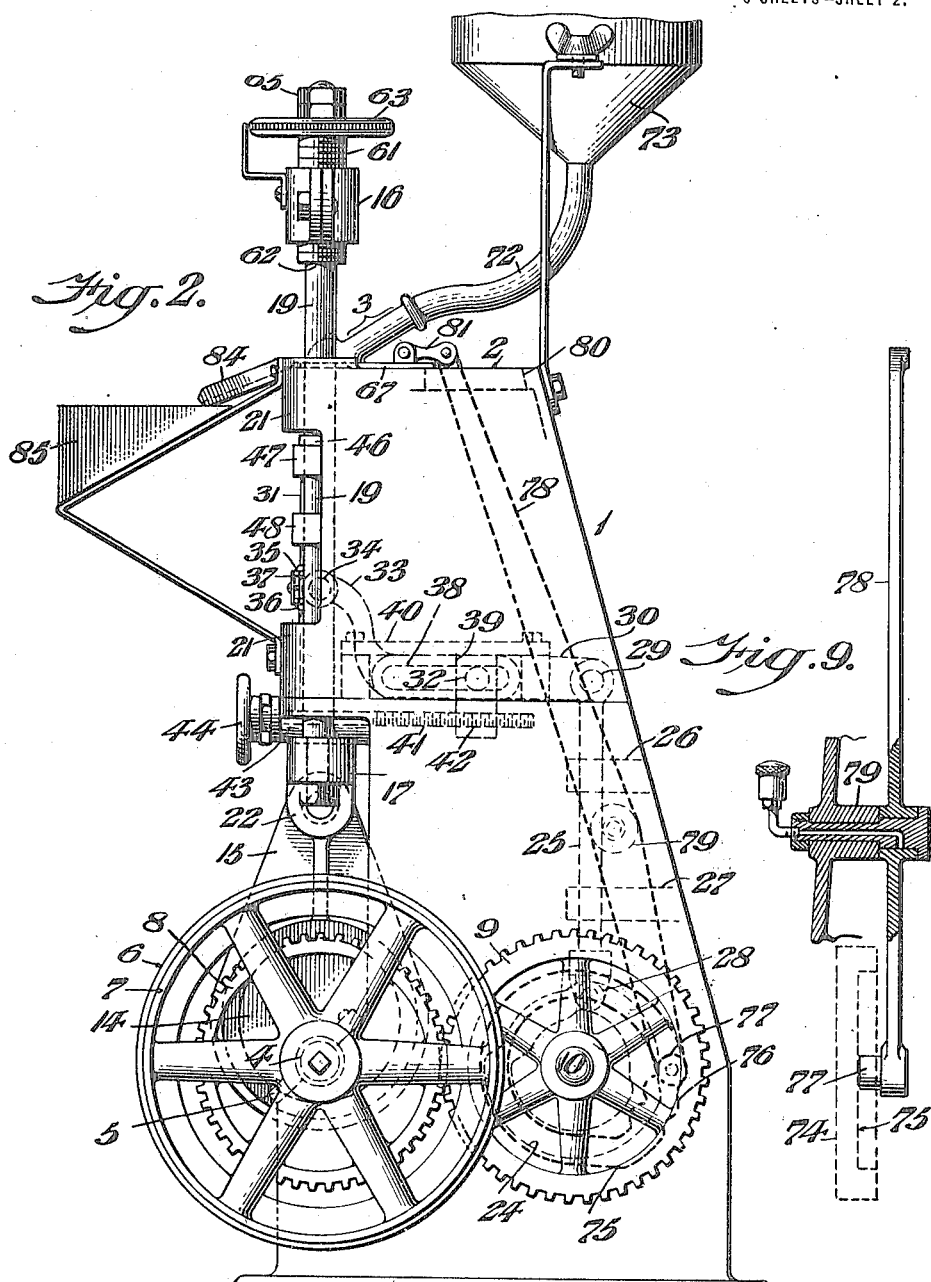
Figure 3:
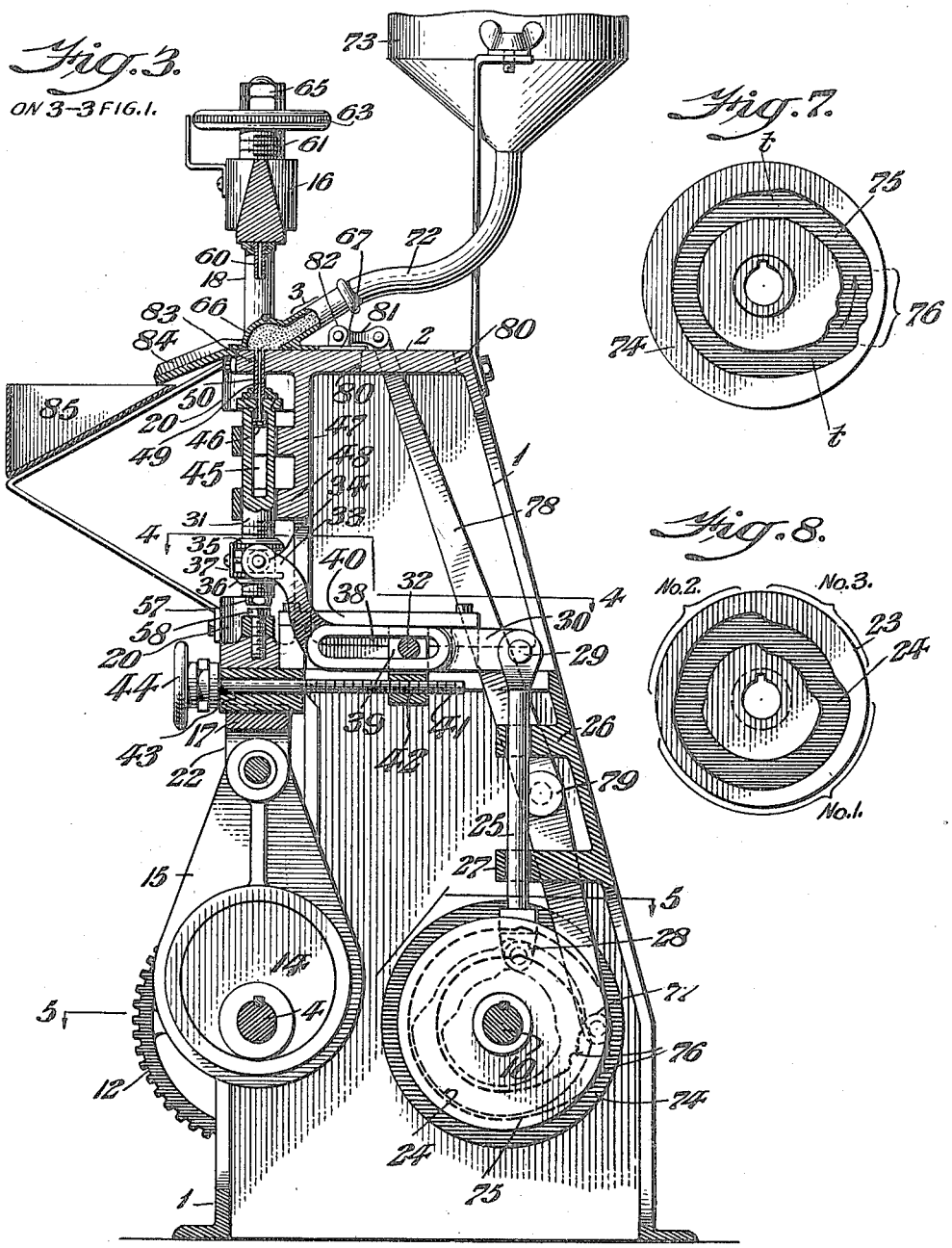
Figure 4:
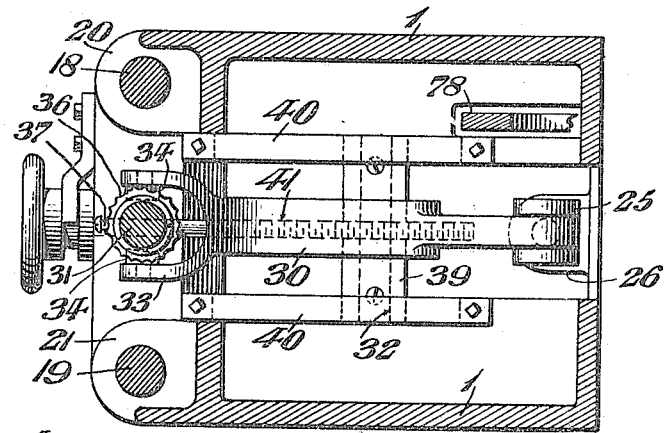
Figure 5:
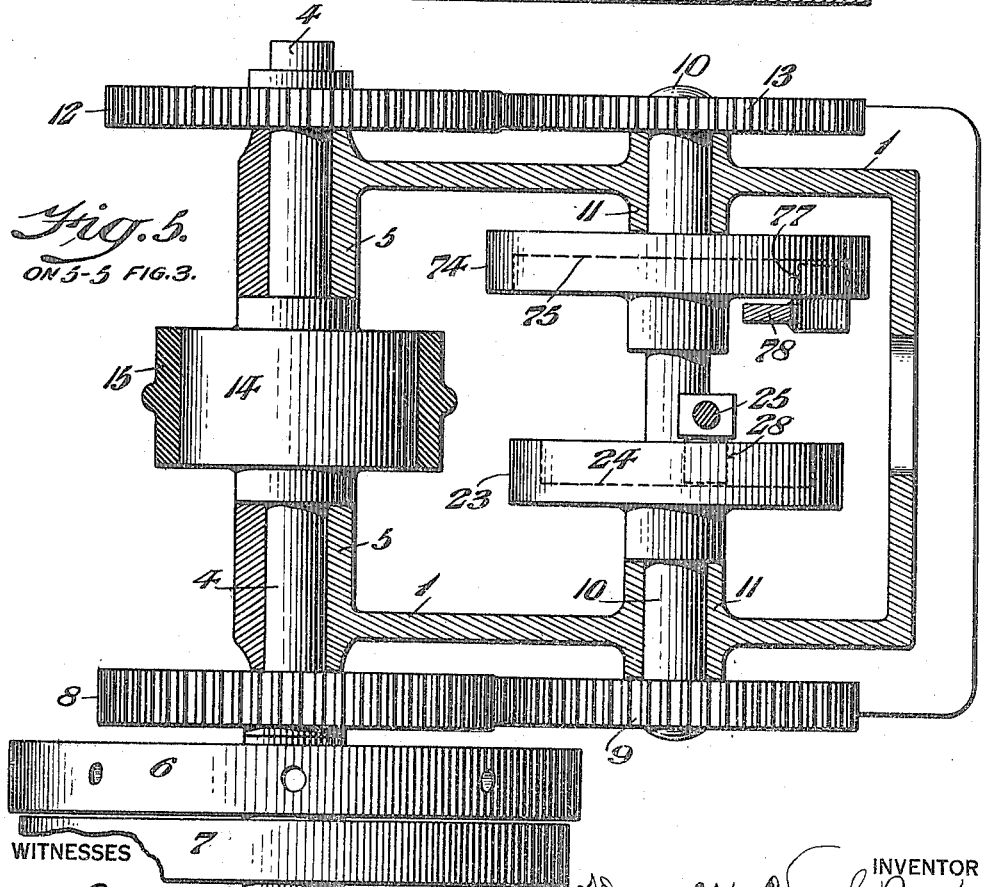

Referring to the drawings: Figure 1 represents in front elevation a machine embodying my invention. Fig. 2 represents the same machine in side elevation viewed from the right-hand of Fig. 1. Fig. 3 represents the machine shown in Figs. 1 and 2 in side sectional elevation, the section being taken on the dotted line 3—3 of Fig. 1, with the sight in the direction of the arrows upon said line. Fig. 4 represents a sectional plan in the plane of the dotted line 4—4 of Fig. 3, sight being taken in the direction of the arrows upon said line. Fig. 5 represents a sectional plan on the plane of the dotted line 5—5 of said Fig. 3. Fig. 6 represents a front elevation of the lower yoke of the upper punch frame cross head removed from the machine. Fig. 7 represents a side elevational view of the rocker cam, also removed from the machine. Fig. 8 represents a side elevational view of the plunger cam, also removed from the machine. Fig. 9 represents a fragmentary, partially sectional and partially elevational, front view of the rocker arm removed from the machine, the view also showing an oil feed for the rocker arm fulcrum. Fig. 10 represents in side elevation and partial section taken on the line 10—10 of Fig. 1, one of the connecting rods for connecting the yoke with the upper crosshead, and the bearings through which it travels. Fig. 11 represents in elevation the punch ram removed from the machine. Fig. 12 represents a sectional plan through said ram on the line 12—12 of Fig. 11. Fig. 13 is a top plan view of the ram head. Fig. 14 represents a central side sectional elevation of the shaking shoe. Fig. 15 represents a bottom plan of said shaking shoe. Fig. 16 represents in front elevation the adjustable bearing for the rocking ram lever of the punch ram, removed from the machine. Fig. 17 represents in side sectional elevation, the upper part of the punch frame, and a pair of the upper and lower punches in the position they occupy when compressing the pellet. Fig. 18 represents a view similar to Fig. 17, showing the parts in the position they occupy when the pellet has been expelled from the compression chamber and is about to be discharged. Fig. 19 represents in front elevation a group or gang of the lower punches and of the core-forming pins which operate with both groups of punches and which the lower punches always encompass. Figs. 20, 22 and 24 represent three typical forms of pellets which my machine produces, the form shown in Fig. 20 being the normal cylindrical form produced by the machine as represented in its entirety. Fig. 22 represents a cylindrical pellet having an inclined upper face produced by a punch of the form represented in Fig. 21, and Fig. 24 represents an elliptical pellet of the form produced by a punch of the type represented in Fig. 23.

Similar numerals of reference indicate corresponding parts.

Generally expressed, my machine comprehends a pair, or in practice a plurality of pairs, of oppositely disposed and oppositely acting punches, axially hollow and adapted to approach and separate from each other with reference to a compression chamber or chambers into which they enter and into which also the powder or other material to be compressed into pellet form is first fed;—a fixed pin or plurality of pins passing through said chamber, through the bores of one set of the punches, preferably the lower, and in the action of the parts entering the bores of the oppositely corresponding set of punches;—a means for feeding the compression chamber with the powder by shaking it into it until it is full, and thereafter when the powder is compressed into pellets expelling the latter from the machine;—and means for occasioning the appropriate cyclical operation of the powder-feeding, shaking and expelling mechanism, and the powder-compressing or pellet-forming devices.

*The frame-work and driving mechanism.*—The machine as an entirety is a die press, which consists of a frame-work 1, the general formation of which is of the usual character and will be understood by considering Figs. 1, 2 and 3. This frame-work is formed with a table top 2, across which the shaking shoe 3 which contains the powder or other granular substance to be fed, compressed into pellets and expelled, has its movement of horizontal reciprocation.

4 is the main or drive shaft extending transversely of the machine and housed in bearings 5 in the framework. This drive shaft carries a fly wheel 6 and a driving pulley 7. It also carries a driving gear wheel 8 keyed to it, which is in mesh with a driven gear wheel 9 keyed on a cam shaft 10, housed in bearings 11 in the frame-work. Both gear wheels 8 and 9 are preferably exterior of the frame.

12 and 13 are what I term balance gear wheels forming a lash gear, of which 12 is keyed to the drive shaft and 13 geared to the cam shaft. The relative arrangement of the shafts and gears is shown in Fig. 5.

*The mechanism for operating the punches.*—14 is an eccentric on the drive shaft, the yoke 15 of which is connected with a vertically reciprocating upper punch-carrying frame, composed of the upper cross-head 16, the lower connecting yoke 17 and the connecting rods 18, 19, which have vertical reciprocatory movement in bearings 20 and 21 in the frame-work. This frame as an entirety carries the upper group of punches and is caused to move in a calculated, definite, vertical reciprocation by its attachment to the eccentric yoke 15 of the eccentric 14 on the drive shaft 4,—the attachment being by journals 22, as shown in the drawings.

The means for carrying the lower group of punches which coöperate with the upper group is particularly disclosed in Figs. 4, 11, 12 and 19 hereinafter referred to, and the operation of reciprocating this lower group of punches in opposition to the reciprocation of the upper group may be occasioned by various devices, of which the following is a satisfactory mechanism.

*The mechanism for operating the lower punches.*—23 is what I term a plunger cam of the side-face type, keyed upon the cam shaft 10 within the frame-work. The cam way 24 of this plunger cam, best shown in Fig. 8, has three curves of traverse, which I have designated by the brackets numbers 1, 2 and 3, and which in the rotation of the cam occasion three predetermined up and down movements of the cam rod 25 housed for vertical movement in the bearings 26, 27, within the frame-work, and provided at its lower end with the cam roller 28, which travels within the cam way 24. At its upper end the cam rod 25 is pivoted at 29 to the rear end of a rocking lever which I term the ram lever 30, because it occasions the lifting and dropping of what I term the slotted punch ram 31, shown in Figs. 2 and 3, and is straight from the pivot 29 along past its fulcrum pin 32 to its front or outer end, where it is bent upwardly and outwardly and spread apart to form a bifurcated head 33, which carries a pair of inturned rollers 34, which travel between a pair of adjustable collars 35, 36, threaded upon the lower portion of the punch ram 31 and which are connected by a connecting plate 37, as shown.

The fulcrum pin 32 of the ram lever 30 passes through a slot 38 in the straight part of the ram lever, and is carried by an adjustable bearing 39, which is housed in ways 40 in the frame-work and adapted to be moved in and out by an adjusting screw 41, which is threaded through a threaded socket 42 in the adjustable bearing 39, and which also passes without threaded relationship through a bearing 43 in the frame and beyond it is provided with a hand wheel 44. By adjusting the screw 41, the positioning of the fulcrum 32 is controlled, and the consequent distance of downward movement of the lower punches limited so as to alter the containing area of the compression chambers to determine the quantity of powder with which it is desired to charge them.

The punch ram 31 is internally hollowed or slotted at 45, the slot or hollow extending to the upper end of the ram, and within said slot is fitted the pin block 46, which rests upon and is fixed to the upper bearing 47 of two bearings 47 and 48 through which the punch ram moves up and down, and which block is attached to the frame and particularly illustrated in Figs. 1, 2, 3, 17 and 18.

Fixedly connected with the pin block are the lower ends of the core-forming pins 49, which pass through the bores of the punches, as already explained, and extend up to the level of the upper surface of the table top 2. The number of pins corresponds with the numbers of the punches of the groups of punches. The punches of the lower group are designated 50 and particularly illustrated in Figs. 17 and 19, and each one of them is fixed and connected to the upper end of the punch ram 31 by any preferred means and conveniently by the cap plate 51, which is laid upon the head 52 of the punch ram and attached thereto by clips 53 and screws 54, as particularly shown in Fig. 19. The cap plate is provided internally and upon its lower face with a number of sockets 55 corresponding to the number of lower punches, into which socket heads 56 formed upon the lower ends of the lower punches 50, and being integral with or attached to said lower punches, enter and are retained. This of course is simply a composite connecting device for effecting a union between the lower punches and the punch ram which raises and lowers them. Further detail of a purely mechanical character shown in the drawing, is not necessary to mention. At its lower end and below the lower bearing 48, the punch ram is conveniently provided with a bottom bolt 57, which is intended when the ram has been drawn down to the limit of its downward movement to encounter a cushioned adjustable stop 58, Fig. 3, attached to the frame-work, which overcomes any shock.

The means of attachment of the group of upper punches to the upper cross-head 60 is entirely similar, although in reverse relation, to the means just described for attaching the lower punches to the ram, and further description of it is, therefore, unnecessary. In order, however, to make easy an adjustment of the entire group of upper punches, I find it convenient to resort to such an attachment as is shown in Figs. 1, 2 and 3, and particularly illustrated in Fig. 10. That is to say, I form the upper cross-head 16 with two internally threaded bearings 59 into which are inserted externally threaded thimbles 61, internally hollow to fit over the upper ends of the connecting rods 18 and 19, which are preferably reduced in size so to have shoulders 62 on them against which the lower ends of the thimbles abut and turn. The thimbles carry thumb wheels 63 and above them are a washer 64 and lock nuts 65, as shown in Fig. 10. This device obviously permits of the vertical adjustment of the group of upper punches,—while the vertical adjustment and extent of up and down movement of the lower group is made possible by the adjustment of the collars 35 and 36 on the ram, and of the fulcrum 32 of the ram lever by means of the adjusting screw 41.

*The powder feeding devices.*—66 is what I term a shaking shoe, Figs. 14 and 15, the same being a hollow device of the character shown, that is to say, a device preferably formed with a basal plate 67, which is flat on its under face and travels upon the flat upper surface of the table top 2 between guide-ways 68, Fig. 1, applied to said top. Springing, in the construction shown, obliquely upward and backward from the front portion of this basal plate, is a container 69, which has a discharge orifice 70 through the plate. A packing ring 71 makes effective closure between the plate and the table and prevents loss of the powder.

72, Fig. 2, is a flexible or bendable conveying tube, which leads from a hopper or storage receptacle 73 for the powder or other granular substance to be treated, to the upper end of the shaking shoe to which it is connected.

As already explained, the shaking shoe or feed device proper, reciprocates on the table top, and although other devices may be resorted to, I prefer to effect the reciprocatory and shaking and oscillatory movement of the shoe by the following means:—

74 is what I term a rocker cam keyed upon the countershaft and being a side face cam the cam way 75 of which is shown in Fig. 7 and has two curves of traverse, a uniform curve to the left of the dotted line T—T on said Fig. 7, and one to the right of said line, which is an irregular curve formed with a series of smaller curves or convolutions designated 76. This cam rotates in the direction of the arrow shown in its cam way. Within this cam way 75 runs the cam roller 77 of a rocker arm 78, fulcrumed at 79 within the frame-work and upwardly extending through a slot 80 in the table top 2, and there connected by a pivoted link 81 with the shaking shoe 3 conveniently by means of a link lug 82.

Formed within the table top 2 near its front end and in appropriate alinement with both the upper and the lower groups of punches, are a plurality of transversely extending vertical compression chambers 83, corresponding in number with the numbers of the groups of the punches. Into and through these chambers centrally extend the core-forming pins 49,—and into and up to a certain distance shown in Fig. 3 the upper ends of the lower plungers are entered, and within them have their up and down movement. Into them also are adapted to be entered and to a given distance to descend the plungers of the upper group.

After the pellets have been compressed and are expelled, as later described, they travel over a discharge chute 84 into a receiver 85.

The formations of the pellets, as already referred to, may be various, and in order to make pellets of, for instance, the formations shown in Figs. 22 and 24, the punches have to be externally formed to produce the desired shape, and this is also true of the compression chambers which must naturally be formed to correspond to the transverse sectional outlines of the plungers. If it be desired that both ends of a pellet should be struck obliquely instead of one end, as shown in Fig. 2, the punches of both groups must be correspondingly shaped.

*The operation.*—The operation of the machine so far as not already described, will be easily understood. It being the intention to feed, and at the same time to effect a certain consolidation to shake, the powder or other substance to be fed into the compression chambers within which, as in a measuring faucet, a given quantity is to be received,—the shaking shoe is caused not only to travel forward and back on the table top through the direct action of the rocker arm 78 when its cam roller is traversing the even course of the cam way 75 of the rocker cam 74,—but is also caused to shake in its travel when said cam roller is traversing the convoluted part 76 of said cam way in said rocker cam. Obviously, while the foregoing is a convenient way of effecting the feed of the powder and the shaking up of its particles before they gravitate into the compression chambers in the advanced position of the shaking shoe shown in Fig. 3, other means than the rocker cam and its rocker arm may be employed to effect the same result.

Assume that the shoe has been advanced so that its discharge orifice 70 is above the compression chambers and that the powder has dropped into them so as to fill them as shown in Fig. 3,—assume also that in this position the lower plungers are down as low as is shown in Fig. 17 and the upper plungers as high as is shown in Figs. 1 or 18,—assume then that the shoe is retracted to, for instance, the position which it occupies in Fig. 17,—and assume further that the upper plungers have descended as in the position of Fig. 17 and that the lower plungers have ascended,—it is obvious that the result then will be that the powder within the compression chambers will be compressed and a pellet of the character shown in Fig. 20 formed. After the foregoing operation, which is accomplished so far as the upper punches are concerned through the eccentric on the main shaft operating upon the cross-head of the frame,—and so far as the lower plungers are concerned accomplished through the ram lever, the cam rod and the plunger cam,—the next step in the operation will be the ascent of the upper punches to the position shown in Fig. 18, and the ascent of the lower punches to the position also shown in said Fig. 18, until their upper ends are level with the upper surface of the table top and the pellets stand upon the lower punches clear of the compression chambers. The next step will then be the further forward advance of the shaking shoe, with the result that it will expel pellets from off the table and into the discharge chute, and in doing so will effect a recharging of the compressing chambers with the shaken up powder, an action then possible because by that time the lower plungers will have been caused to descend to their first position so as to leave the compression chambers unfilled by them.

All of the foregoing operations and the cycle in which they occur and are repeated over and over again, are due to the formation of the cam ways of the plunger cam and the rocker cam, as already explained, to the operation of said two cams and to that of the eccentric and its yoke acting upon the punch ram.

It will now be apparent that I have devised a novel and useful construction which embodies the features of advantage enumerated as desirable, and that while I have in the present instance, shown and described a preferred embodiment of it which will in practice be found to give satisfactory and reliable results, it is to be understood that the embodiment is susceptible of modification in various particulars, without departing from the spirit or scope of the invention or sacrificing any of its advantages.

Having thus described my invention, what I claim as new and desire to secure by Letters Patent, is:—

1. A machine of the character described comprising, in combination, a punch ram, a punch carried thereby and an actuating means for said ram comprising a rocking lever fulcrumed intermediate its ends and pivoted at one end to the punch ram, an actuating means for said rocking lever pivoted to the opposite end thereof and means for shifting the fulcrum of the rocking lever lengthwise of said lever.

2. A machine of the character described comprising, in combination, a punch ram, a punch carried thereby and means for actuating said punch ram, said means comprising a rocking lever, a fulcrum for said rocking lever, manually operable means for shifting said fulcrum lengthwise of the lever, a connection between one end of the rocking lever and the punch ram, said connection being adjustable lengthwise of the punch ram and an actuating member connected to the opposite end of the rocking lever.

3. A machine of the character described comprising, in combination, a punch ram, a slotted rocking lever connected at one of its ends to the punch ram, an actuating member connected to the other end of the slotted lever, a fulcrum passing through the slot of the lever, a movable bearing by which the fulcrum is carried and a manually operable screw engaging said movable bearing for shifting the fulcrum with relation to the slotted lever.

4. A machine of the character described comprising, in combination, a frame having a horizontal table at the upper portion thereof, a feed shoe movable over said table, a plurality of upper punches disposed to operate above said table, a plurality of lower punches, compression chambers formed in the table and within which the lower punches operate, a driving shaft disposed transversely of the frame beneath the punches and at the front side of the frame, a driven shaft parallel with the driving shaft at the lower rear portion of the frame, driving connections between said shafts, means for actuating the upper plungers from the first named shaft, a cam upon the driven shaft, a rocking lever extending from front to rear of the frame and pivoted intermediate its ends, means connected to the rear end of said lever and to said cam for actuating the lever from the cam, connections between the forward end of the lever and the lower punches, a second cam upon the driven shaft, a rocking lever pivoted intermediate its ends and having its lower end engaged with the last named cam and a connection between the upper end of said lever and said shoe.

In testimony whereof I have hereunto signed my name this fifteenth day of March, 1916.

WAYNE MacVEAGH BARKER.

In the presence of—
J. B. TAYLOR,
JOHN A. WIEDERSHEIM.

Copies of this patent may be obtained for five cents each, by addressing the "Commissioner of Patents, Washington, D. C."